(12) United States Patent
Karni

(10) Patent No.: US 12,354,162 B2
(45) Date of Patent: Jul. 8, 2025

(54) SYSTEMS AND METHODS FOR DYNAMICALLY DETERMINING THE BEST RESPECTED MOVING AVERAGE LINES ASSOCIATED WITH A TIME SERIES DATA SET

(71) Applicant: Tomer Karni, Cedar Park, TX (US)

(72) Inventor: Tomer Karni, Cedar Park, TX (US)

( * ) Notice: Subject to any disclaimer, the term of this patent is extended or adjusted under 35 U.S.C. 154(b) by 42 days.

(21) Appl. No.: 17/966,835

(22) Filed: Oct. 15, 2022

(65) Prior Publication Data
US 2023/0121239 A1 Apr. 20, 2023

Related U.S. Application Data

(60) Provisional application No. 63/256,274, filed on Oct. 15, 2021.

(51) Int. Cl.
*G06Q 40/04* (2012.01)

(52) U.S. Cl.
CPC .................................. *G06Q 40/04* (2013.01)

(58) Field of Classification Search
CPC ..................................................... G06Q 40/00
USPC ............................................................ 705/35
See application file for complete search history.

(56) References Cited

U.S. PATENT DOCUMENTS

| | | | | | |
|---|---|---|---|---|---|
| 5,297,032 A | * | 3/1994 | Trojan | ................... | G06Q 40/04 705/37 |
| 5,761,442 A | * | 6/1998 | Barr | ...................... | G06Q 40/06 705/36 R |
| 5,812,988 A | * | 9/1998 | Sandretto | ............... | G06Q 40/00 702/179 |
| 6,014,645 A | * | 1/2000 | Cunningham | ......... | G06Q 40/00 235/379 |
| 6,021,402 A | * | 2/2000 | Takriti | ................... | G06Q 50/06 700/32 |
| 6,058,379 A | * | 5/2000 | Odom | ..................... | G06Q 40/04 705/37 |
| 6,313,833 B1 | * | 11/2001 | Knight | ................... | G06Q 40/06 705/37 |
| 6,345,090 B1 | * | 2/2002 | Walker | .................. | G06Q 40/04 379/114.03 |
| 6,850,907 B2 | * | 2/2005 | Lutnick | .................. | G06Q 40/04 705/37 |
| 6,954,758 B1 | * | 10/2005 | O'Flaherty | ............ | G06Q 30/02 707/999.102 |
| 7,165,037 B2 | * | 1/2007 | Lazarus | ............. | G06Q 30/0269 705/7.31 |
| 7,376,431 B2 | * | 5/2008 | Niedermeyer | ........... | G07C 9/22 379/189 |

(Continued)

*Primary Examiner* — Kirsten S Apple
(74) *Attorney, Agent, or Firm* — Outlier Patent Attorneys, PLLC

(57) ABSTRACT

The present disclosure describes an inventive approach to using moving average calculations associated with financial asset value data to provide more detailed moving average analysis for use in aiding trading decisions. The present invention provides the ability to identify which of a plurality of moving average calculations and/or curves provide the best indication of support or resistance for fluctuations in financial asset value data. The present invention further provides for dynamically updating the moving average calculations as financial asset values change over time and provides real-time feedback to users regarding changes in the moving average calculations.

20 Claims, 11 Drawing Sheets

(56) References Cited

U.S. PATENT DOCUMENTS

| | | | | |
|---|---|---|---|---|
| 8,082,204 B2* | 12/2011 | Mittal | G06Q 40/06 | 705/37 |
| 8,104,678 B2* | 1/2012 | Yoshikawa | G06Q 20/4037 | 235/492 |
| RE43,435 E* | 5/2012 | Krause | G06Q 40/06 | 705/37 |
| 8,234,201 B1* | 7/2012 | Canabarro | G06Q 40/06 | 705/36 R |
| 8,266,045 B2* | 9/2012 | Waelbroeck | G06Q 40/04 | 705/37 |
| 8,412,605 B2* | 4/2013 | Griffin | G06Q 40/02 | 705/76 |
| 8,738,498 B2* | 5/2014 | Daley | G06Q 40/06 | 705/37 |
| 8,788,396 B2* | 7/2014 | Cole | G06Q 40/06 | 705/37 |
| 8,977,565 B2* | 3/2015 | Alderucci | G06Q 40/06 | 705/37 |
| 2002/0087455 A1* | 7/2002 | Tsagarakis | G06Q 30/06 | 705/64 |
| 2002/0161677 A1* | 10/2002 | Zumbach | G06Q 40/00 | 707/E17.001 |
| 2002/0184134 A1* | 12/2002 | Olsen | G06Q 40/06 | 705/37 |
| 2003/0149648 A1* | 8/2003 | Olsen | G06Q 40/00 | 705/35 |
| 2005/0187854 A1* | 8/2005 | Cutler | G06Q 40/04 | 705/37 |
| 2005/0192899 A1* | 9/2005 | Reardon | G06Q 40/00 | 705/40 |
| 2005/0283422 A1* | 12/2005 | Myr | G06Q 30/08 | 705/37 |
| 2007/0118453 A1* | 5/2007 | Bauerschmidt | G06Q 40/02 | 705/36 R |
| 2007/0156479 A1* | 7/2007 | Long | G06Q 10/04 | 705/36 R |
| 2007/0156573 A1* | 7/2007 | Whitehurst | G06Q 40/04 | 705/37 |
| 2007/0244795 A1* | 10/2007 | Lutnick | G06Q 40/04 | 705/37 |
| 2008/0301019 A1* | 12/2008 | Monk | G06Q 20/4016 | 705/35 |
| 2009/0070252 A1* | 3/2009 | Bartels | G06Q 40/04 | 705/37 |
| 2009/0125448 A1* | 5/2009 | Borkovec | G06Q 40/04 | 705/36 R |
| 2010/0023460 A1* | 1/2010 | Hughes | G06Q 40/06 | 705/36 R |
| 2010/0057627 A1* | 3/2010 | Lutnick | G06Q 40/04 | 705/37 |
| 2010/0076886 A1* | 3/2010 | Adams | G06Q 40/06 | 705/37 |
| 2010/0191637 A1* | 7/2010 | Alderucci | G06Q 40/04 | 705/37 |
| 2010/0287114 A1* | 11/2010 | Bartko | G06Q 40/06 | 705/37 |
| 2010/0312701 A1* | 12/2010 | Bosch | G07F 19/20 | 705/43 |
| 2011/0145149 A1* | 6/2011 | Valdes | G06Q 20/102 | 705/44 |
| 2011/0178912 A1* | 7/2011 | Parsons | G06Q 40/00 | 705/35 |
| 2011/0264581 A1* | 10/2011 | Clyne | G06Q 20/10 | 705/39 |
| 2012/0005064 A1* | 1/2012 | Chi | G06Q 40/04 | 705/37 |
| 2012/0029956 A1* | 2/2012 | Ghosh | G06Q 40/063 | 705/7.11 |
| 2012/0278254 A1* | 11/2012 | Rosenthal | G06Q 40/06 | 705/36 R |
| 2012/0323764 A1* | 12/2012 | Boberski | G06Q 40/04 | 705/39 |
| 2013/0006842 A1* | 1/2013 | Jagannath | G06Q 40/06 | 705/37 |
| 2013/0226764 A1* | 8/2013 | Battyani | G06Q 40/04 | 705/37 |
| 2014/0156491 A1* | 6/2014 | Koh | G06Q 40/04 | 705/37 |
| 2014/0229353 A1* | 8/2014 | Lutnick | G06Q 40/04 | 705/37 |
| 2017/0109822 A1* | 4/2017 | Borkovec | G06Q 40/04 | |
| 2017/0365000 A1* | 12/2017 | Wittkotter | G06F 16/2456 | |
| 2020/0202442 A1* | 6/2020 | Kepros | G06Q 40/06 | |
| 2021/0192435 A1* | 6/2021 | Fernandes | G06Q 10/087 | |
| 2023/0121239 A1* | 4/2023 | Karni | G06Q 40/04 | 705/37 |

\* cited by examiner

Table 1. Exemplary hyperparameters and associated descriptions

| Hyperparameter | Description |
| --- | --- |
| HP1 | Sampling interval property/variable to be used in moving average line calculation(s) |
| HP2 | Sampling interval property/variable to fit the moving average to |
| HP3 - HP3a | Range of most recent data points to use in fitting analysis |
| HP4 | Fitting measurement method to use |
| HP4a | Inclusion/exclusion of intersection of moving average line with data point line |
| HP5 | Number of best respected moving average lines to output |
| HP6 | Moving average line type(s) to use (e.g. simple, exponential, etc.) |
| HP7 | Minimum number of periods (or data points) to use in generating moving average lines |
| HP8 | Maximum number of periods (or data points) to use in generating moving average lines |
| HP9 | Other hyperparameters |

FIG. 8

SYSTEMS AND METHODS FOR DYNAMICALLY DETERMINING THE BEST RESPECTED MOVING AVERAGE LINES ASSOCIATED WITH A TIME SERIES DATA SET

CROSS-REFERENCE TO RELATED APPLICATIONS

This application claims the benefit of U.S. Provisional Application 63/256,274, filed Oct. 15, 2021, titled "SYSTEMS AND METHODS FOR DYNAMICALLY DETERMINING THE BEST RESPECTED MOVING AVERAGE LINES ASSOCIATED WITH A TIME SERIES DATA SET," which is herein incorporated by reference in its entirety.

BACKGROUND

Moving average calculations can be used in stock market trading as a means to aid in trading decisions such as deciding whether to buy, sell, or hold a given stock. Connecting moving average values with a line and plotting the line along with stock prices creates a visual representation of a relatively smooth price curve that tones down noise associated with sporadic price fluctuations. Evaluating how a given stock performs relative to a moving average line associated with that stock at a certain time can provide an indication to a trader, investor or automated trading system whether the current stock price is supported or resisted, if the price is trending closer or further from a position of support or resistance, and identify timepoints when an action should be taken such as buying or selling a given stock. It is not uncommon for a stock price to trade up above (or down below) a certain moving average line for a meaningful time period. At times, the trading price gets very close to that certain moving average line, occasionally touching it and possibly even shortly piercing it, before bouncing back to continue its original trend along that certain moving average line. This phenomenon is described as 'price respects the moving average line' (as support or as resistance).

Current approaches to using moving averages in association with stock trading decisions tend to be generic, treat all stock price data sets equally, and fail to consider the unique characteristics of each data set. For example, some commonly used moving average calculations consider 8, 10, 21, 50 or 200 time periods (or data points) which don't necessarily reflect the best moving average option for a given stock or data set. These conventional approaches fail to consider how closely a moving average line fits to the data set and that the fit of a moving average line to different subsets of the data set may be more important than fit across the entire data set or different subsets. Since each stock price history data set is unique, the ideal number of data points to use for a moving average calculation on one data set may not be the ideal number of data points to use on a different data set and the portion of the data set to focus on for fitting may differ by stock and/or user preference. Thus, the conventional approaches fall short by applying a generic approach which treats all data sets equally and failing to consider fitting aspects of the moving average lines to the data sets.

Furthermore, given the dynamic nature of the stock market, data sets associated with a given stock are constantly changing and subsequently the ideal number of data points to use in evaluating a moving average may also change over time. The use of the standard, fixed number of data points as discussed above fails to account for the dynamic nature of each stock and its associated data set and fails to identify the best moving average calculation for a given data set in real time as that data set changes (e.g. as new stock price data becomes available).

Another variable of consideration in analyzing stock market trends is weighting and whether more recent data points should be given more weight than previous data points. Exemplary approaches to incorporating weighting into moving average calculations include computing a simple moving average line (which applies equal weights to all data points) or an exponential moving average line (which applies greater weight to more recent data points). Other considerations such as sampling interval (e.g. using stock prices at 5 minute intervals, hourly, daily, weekly, etc.) may alone or in combination with the above factors, affect the moving average line calculations, and how well a moving average line fits to the data set. Ultimately, current approaches fail to adequately consider the effects each of these variables have on a moving average line calculation and the degree of fit of calculated moving average lines to the data set and thus leave individuals to make trading decisions on potentially sub-optimal moving average calculation results.

SUMMARY

The present invention addresses these limitations by dynamically determining, in real time as additional data is acquired, the number of periods to use, whether to use unweighted (simple) or weighted (exponential) moving average, dynamically determining the moving average lines that are respected by the data set, and identifying which of these moving average lines is the best respected line for a given set of user preferences. With respect to stock market applications, a respected moving average line is one where a stock price generally remains above or below the moving average line for a substantial period of time or number of data points as opposed to a moving average line where the stock price repeatedly crosses the moving average line over that period of time or number of data points. The best respected, or best fitted moving average line is the one that is the closest to the stock price amongst all the respected moving average lines. The systems and methods disclosed herein obtain user preference data and hyperparameters (some which may be defined by user preferences), obtain financial asset data such as stock symbol price data in accordance with user preferences, compute a plurality of moving average lines based on the user preferences and hyperparameters, compute fitting measurements of the moving average lines in accordance with the user preferences and hyperparameters, rank the fitting measurements and output the results of the ranking such that a user is able to see the best fitting results in accordance with their established user preferences. Ranking the fitting measurements comprises determining the moving average line(s) that the data set best respects over a specified time period or set of data points (e.g. data points remain generally above the moving average line(s) during the specified time period without crossing under to remain generally below the moving average line for the remaining specified time period, and vice versa. The best respected, or best fitted moving average line is the one that is the closest to the data points amongst all the respected moving average lines). The systems and methods further provide functionality to update these computations and measurements in real time as new data becomes available or as user preferences are modified such that a user can see in real time the effects of changing different variables or hyperparameters on moving average line calculations. While described herein with respect to financial asset data and the stock market, it is noted that the approaches can be applied to any time series data, in particular those which have a tendency to change over time (e.g. asset values such as property values, consumer goods and services, etc.) and the details associated with stock market analysis are merely exemplary and not limiting.

There are a number of approaches to evaluating financial asset data (e.g. stocks, stock options, futures, cryptocurrencies, indexes, bond yields, currency pairs and other financial assets) and identifying trading indicators, such as leading indicators and lagging indicators. For example, standard deviation, average directional index, stochastic oscillator, relative strength index, moving average convergence divergence, and Bollinger bands, comprise but a few of the many indicators which can be used in evaluating financial asset data. The present invention focuses on a particular approach to moving average trading indicators to identify a best moving average line (or a plurality of best lines) from amongst a plurality of computed moving average lines for a given data set and dynamically updates what is considered the best moving average line(s) as the data set changes over time (e.g. due to fluctuations in the value of the financial asset, due to fluctuations in trading volume associated with the financial asset, etc.). While the conventional approach to moving average calculations relies on several standard or default moving average calculations (e.g. based on 8, 10, 21, 50, 200 time periods), the present invention provides an unconventional approach which is not constrained to any particular standard or default moving average calculation, but instead provides the capability to identify the best moving average calculation(s) and associated curve(s) thereby providing unique information to traders which is not available using the standard or default moving average calculations. For example, the identified best respected (supporting or resisting) moving average curve may be associated with a non-standard time period and the present invention allows for determining precisely what the best moving average curve(s) is/are and the time period over which the best fit is present. Ultimately, this provides more granular information to traders regarding how the value of a financial asset is or has been progressing over time allowing for trading decisions based on more detailed information that conventional approaches lack. In addition to providing more granular details about the particular time period(s) associated with the best support/resistance of a financial asset's value, the present approach may also identify broader areas of support/resistance (as opposed to just information for particular conventional time periods), such as the duration of support/resistance or a time since support/resistance began for a given moving average curve.

Accordingly, some embodiments may provide multiple technological advantages over prior art systems. In addition, various embodiments may provide improvements in computing technology and technological features, for instance, by providing dynamic computing and identifying curve fitting lines which offer an indication of support or resistance for fluctuations in financial asset values over time. Such embodiments may improve, inter alia, the efficiency of computing systems associated with trading platforms and trading decision analysis. One non-limiting example of a technological advantage may include providing an improved user experience for users attempting to perform a transaction or otherwise interact with a financial asset trading platform by providing a customized and financial asset evaluation process. Another non-limiting example of a technological advantage may include providing an improved trading platform for users to utilize a third-party financial asset analysis. An additional non-limiting example of a technological advantage may include determining optimal moving average analysis of financial assets by performing a customized analysis process, instead of only using standard or default moving average computations common in the art.

BRIEF DESCRIPTION OF THE DRAWINGS

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

FIG. 8 is an exemplary table of hyperparameters as described in the specification.

DETAILED DESCRIPTION

Figure 1:
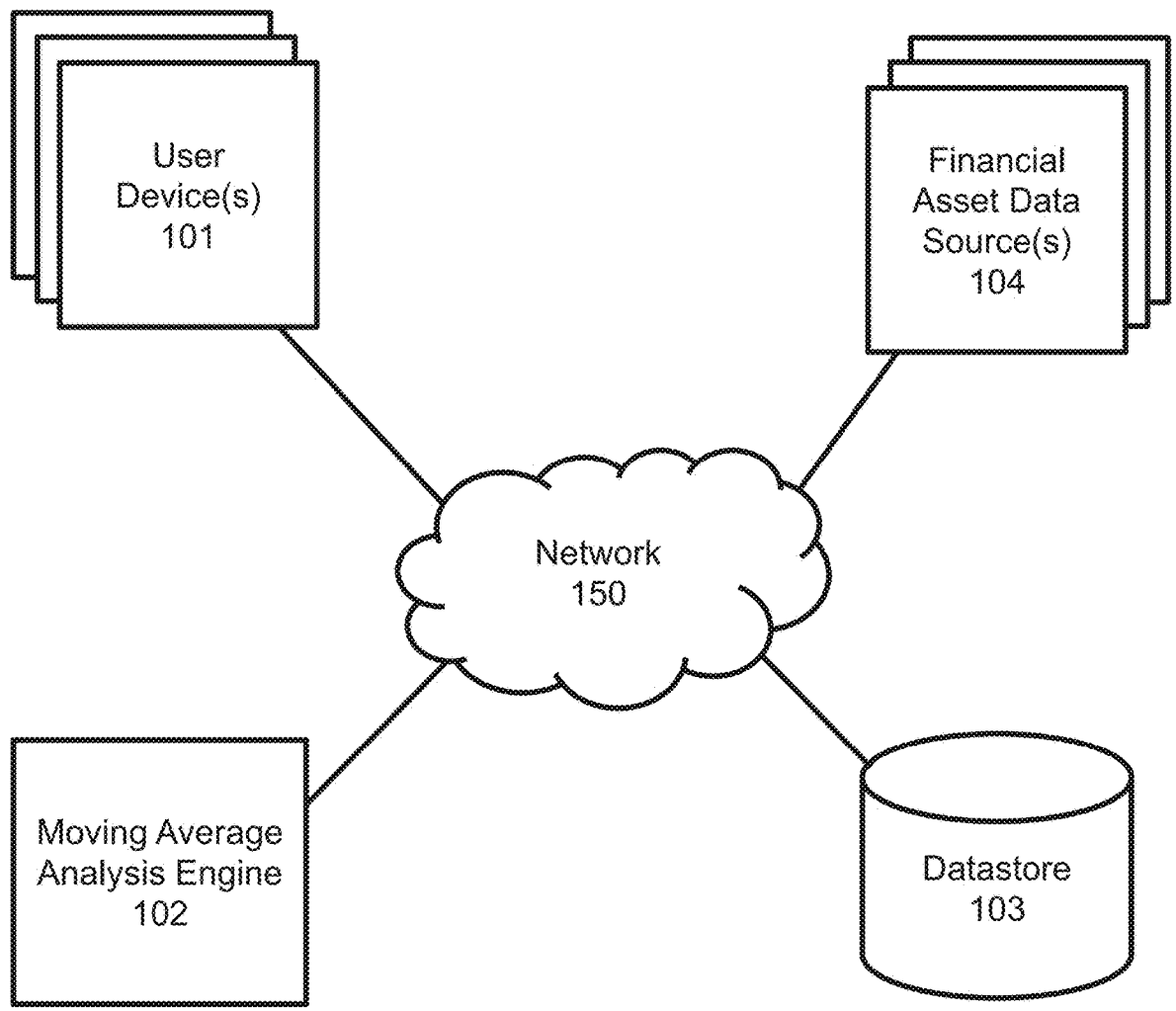
FIG. 1 illustrates a system for processing financial asset data in accordance with an exemplary embodiment of the invention.

One or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural, logical, software, electrical and other changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible embodiments and in order to more fully illustrate one or more embodiments. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, method, or algorithm is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various embodiments in which, for example, functions may be executed out of order from that shown or discussed, including substantially concurrently or in reverse order, depending on the functionality involved, as would be understood by those having ordinary skill in the art.

The detailed description set forth herein in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

FIG. 1 illustrates an exemplary embodiment of a system for analyzing financial asset data according to one embodiment. The system comprises a user device(s) 101, moving average analysis engine 102, a datastore 103, financial asset data source(s) 104, and a network 150 over which the various components communicate and interact. The various components described herein are exemplary and for illustration purposes only and any combination or subcombination of the various components may be used as would be apparent to one of ordinary skill in the art. The system may be reorganized or consolidated, as understood by a person of ordinary skill in the art, to perform the same tasks on one or more other servers or computing devices without departing from the scope of the invention.

User device(s) 101 generally comprises a computing device for communicating with the other components of the system and displaying relevant information. User device(s) 101 provide information associated with at least one user preference and/or hyperparameter for use by the moving average analysis engine 102 in analyzing financial asset data. User device(s) 101 may specify the financial asset data to be analyzed such as stock market data associated with at least one stock symbol. User device(s) 101 display results from the moving average analysis engine 102, such as graphical representation associated with a moving average analysis of the financial asset data.

User device(s) 101 include, generally, a computer or computing device including functionality for communicating (e.g., remotely) over a network 150. Data may be collected from user devices 101, and data requests may be initiated from each user device 101. User device(s) 101 may be a server, a desktop computer, a laptop computer, personal digital assistant (PDA), an in- or out-of-car navigation system, a smart phone or other cellular or mobile phone, or mobile gaming device, among other suitable computing devices. User devices 101 may execute one or more user applications, such as a web browser (e.g., Microsoft Windows Internet Explorer, Mozilla Firefox, Apple Safari, Google Chrome, and Opera, etc.), or a dedicated application to submit user data, or to make prediction queries over a network 150.

In particular embodiments, each user device 101 may be an electronic device including hardware, software, or embedded logic components or a combination of two or more such components and capable of carrying out the appropriate functions implemented or supported by the user device 101. For example and without limitation, a user device 101 may be a desktop computer system, a notebook computer system, a netbook computer system, a handheld electronic device, or a mobile telephone. The present disclosure contemplates any user device 101. A user device 101 may enable a network user at the user device 101 to access network 150. A user device 101 may enable its user to communicate with other users at other user devices 101.

A user device 101 may have a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user device 101 may enable a user to enter a Uniform Resource Locator (URL) or other address directing the web browser to a server, and the web browser may generate a Hyper Text Transfer Protocol (HTTP) request and communicate the HTTP request to server. The server may accept the HTTP request and communicate to the user device 101 one or more Hyper Text Markup Language (HTML) files responsive to the HTTP request. The user device 101 may render a web page based on the HTML files from server for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

The user device 101 may also include an application that is loaded onto the user device 101. The application obtains data from the network 150 and displays it to the user within the application interface.

Exemplary user devices are illustrated in some of the subsequent figures provided herein. This disclosure contemplates any suitable number of user devices, including computing systems taking any suitable physical form. As example and not by way of limitation, computing systems may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computing system may include one or more computer systems; be unitary or distributed; span multiple locations; span multiple machines; or reside in a cloud, which may include one or more cloud components in one or more networks. Where appropriate, one or more computing systems may perform without substantial spatial or temporal limitation one or more steps of one or more methods described or illustrated herein. As an example, and not by way of limitation, one or more computing systems may perform in real time or in batch mode one or more steps of one or more methods described or illustrated herein. One or more computing systems may perform at different times or at different locations one or more steps of one or more methods described or illustrated herein, where appropriate.

Moving average analysis engine 102 comprises computing hardware and/or software operable to receive financial asset data, information from user device(s) and/or datastore 103, and process the financial asset data in accordance with user preferences and/or hyperparameters in order to determine moving average information associated with the financial asset data. In one aspect, the moving average analysis engine 102 performs a plurality of moving average calculations, ranks the moving average calculations according to ranking criteria associated with at least one fitting parameter, and outputs the results of the moving average calculations to at least one of the user device(s) 101 and datastore 103. In one aspect, moving average analysis engine 102 plots at least one moving average line along with the financial asset data as the output. In one aspect, moving average analysis engine 102 provides at least one moving average line along with the financial asset data as output to user device 101 to be plotted or otherwise displayed on user device 101. Although depicted as a separate component in this figure, moving average analysis engine 102 may be incorporated into user device(s) 101, or another computing device without departing from the scope of the invention.

Datastore 103 comprises at least one storage component for storing information associated with the system such as financial asset data, user preferences, hyperparameters associated with data processing, results associated with data processing, etc. Although depicted as a separate component in this figure, datastore 103 may be incorporated into user device(s) 101, moving average analysis engine 102, or another computing device without departing from the scope of the invention.

Financial asset data 104 generally comprises any financial asset data associated with changing values. While described herein primarily with respect to stock market data, this is merely exemplary and for explanatory purposes and not limiting to the scope of the invention. As alternatives to financial asset data, other time series data (generally any data set that fluctuates over time) may be processed using the disclosed systems and methods including, but not limited to, property values, inflation, disease incidence, climate data, etc.

Network cloud 150 generally represents a network or collection of networks (such as the Internet or a corporate intranet, or a combination of both) over which the various components illustrated in FIG. 1 (including other components that may be necessary to execute the system described herein, as would be readily understood to a person of ordinary skill in the art). In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network 150 or a combination of two or more such networks 150. One or more links connect the systems and databases described herein to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable network 150, and any suitable link for connecting the various systems and databases described herein.

The network 150 connects the various systems and computing devices described or referenced herein. In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network 421 or a combination of two or more such networks 150. The present disclosure contemplates any suitable network 150.

One or more links couple one or more systems, engines or devices to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable links coupling one or more systems, engines or devices to the network 150.

In particular embodiments, each system or engine may be a unitary server or may be a distributed server spanning multiple computers or multiple datacenters. Systems, engines, or modules may be of various types, such as, for example and without limitation, web server, news server, mail server, message server, advertising server, file server, application server, exchange server, database server, or proxy server. In particular embodiments, each system, engine or module may include hardware, software, or embedded logic components or a combination of two or more such components for carrying out the appropriate functionalities implemented or supported by their respective servers. For example, a web server is generally capable of hosting websites containing web pages or particular elements of web pages. More specifically, a web server may host HTML files or other file types, or may dynamically create or constitute files upon a request, and communicate them to users devices or other devices in response to HTTP or other requests from users devices or other devices. A mail server is generally capable of providing electronic mail services to various users devices or other devices. A database server is generally capable of providing an interface for managing data stored in one or more data stores.

In particular embodiments, one or more data storages may be communicatively linked to one or more servers via one or more links. In particular embodiments, data storages may be used to store various types of information. In particular embodiments, the information stored in data storages may be organized according to specific data structures. In particular embodiment, each data storage may be a relational database. Particular embodiments may provide interfaces that enable servers or clients to manage, e.g., retrieve, modify, add, or delete, the information stored in data storage.

The system may also contain other subsystems and databases, which are not illustrated in FIG. 1, but would be readily apparent to a person of ordinary skill in the art. For example, the system may include databases for storing data, storing features, storing outcomes (training sets), and storing models. Other databases and systems may be added or subtracted, as would be readily understood by a person of ordinary skill in the art, without departing from the scope of the invention.

Figure 2A:
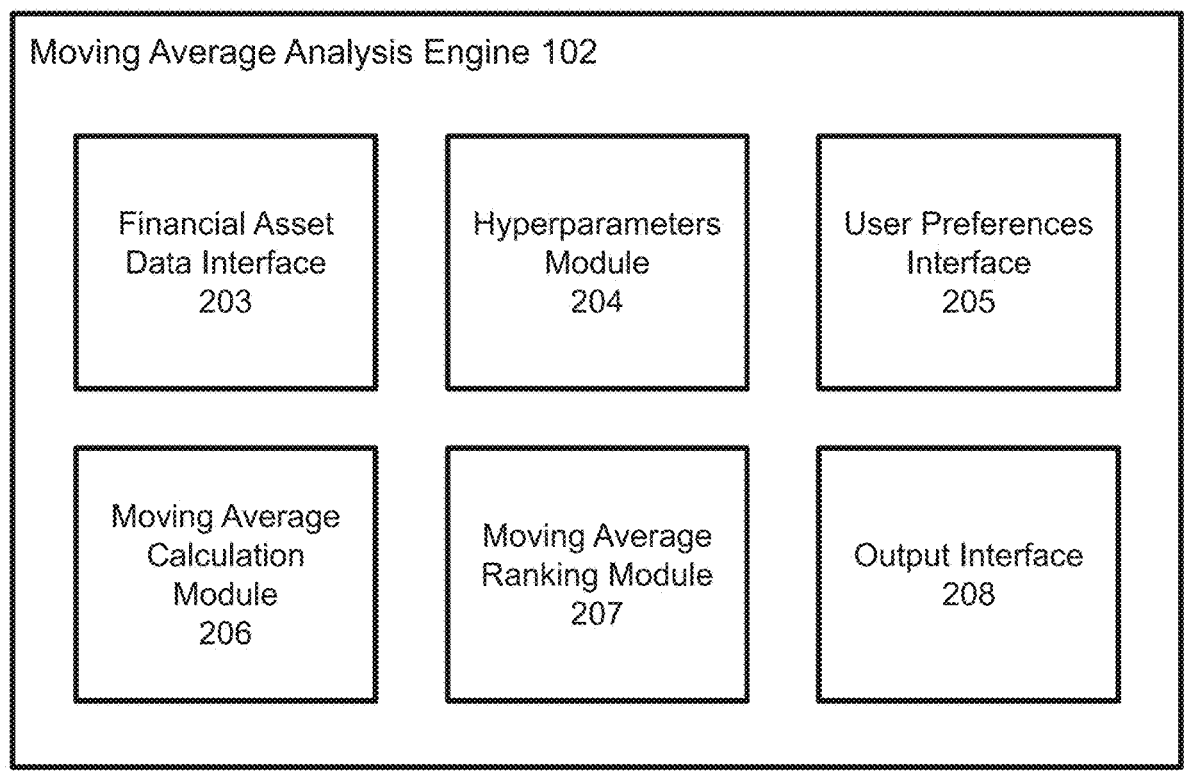
FIG. 2A illustrates a system for computing and ranking moving average lines in accordance with an exemplary embodiment of the present invention.

FIG. 2A illustrates an exemplary embodiment of the moving average analysis engine 102. The moving average analysis engine 102 comprises a financial asset data interface 203, hyperparameters module 204, user preferences interface 205, moving average calculation module 206, moving average ranking module 207, and output interface 208. Other components and databases may be used, as would be readily understood by a person of ordinary skill in the art, without departing from the scope of the invention.

The financial asset data interface 203 is operable to obtain financial asset data for analysis by the moving average analysis engine 102 by communicating with financial asset data source(s) such as real-time data sources or datastores.

In one aspect, such as stock market applications, financial asset data interface 203 obtains stock market data for at least one stock, index, or other stock market measure in accordance with at least one user preference. For example, financial asset data interface 203 obtains data associated with a stock of interest determined in association with at least one user preference obtained from the user preference interface 205. In one aspect, financial asset data interface 203 is operable to obtain a single dataset such as obtaining the last N-periods of data, where N is determined in association with at least one user preference. For example, financial asset data interface 203 may obtain a snapshot at market close of data for the past N trading days for use in determining after hours trading decisions. In one aspect, financial asset data interface 203 is operable to repeatedly obtain updated financial asset data in real-time in accordance with user preferences such as those discussed below in association with the user preferences interface 205. For example, financial asset data interface 203 may obtain price data at intervals such as 5 minutes, 10 minutes, 15 minutes, etc. for use in determining real-time, live market trading decisions. In one aspect, financial asset data interface 203 is operable to obtain data from financial asset data source(s) (e.g. such as financial asset data source(s) 104 of FIG. 1) in association with an application programming interface (API).

Hyperparameters module 204 is operable to obtain and/or determine hyperparameters to be used in moving average calculations, fitting analysis, and presentation of calculations and analysis results. Hyperparameters module determines at least one hyperparameter as part of the data processing and/or obtains at least one of the hyperparameters as specified by a user via user preference interface. Exemplary hyperparameters comprise at least one of the parameters listed in the following table.

TABLE 1

Exemplary hyperparameters and associated descriptions

| Hyperparameter | Description |
| --- | --- |
| HP1 | Sampling interval property/variable to be used in moving average line calculation(s) |
| HP2 | Sampling interval property/variable to fit the moving average to |
| HP3-HP3a | Range of most recent data points to use in fitting analysis |
| HP4 | Fitting measurement method to use |
| HP4a | Inclusion/exclusion of intersection of moving average line with data point line |
| HP5 | Number of best respected moving average lines to output |
| HP6 | Moving average line type(s) to use (e.g. simple, exponential, etc.) |
| HP7 | Minimum number of periods (or data points) to use in generating moving average lines |
| HP8 | Maximum number of periods (or data points) to use in generating moving average lines |
| HP9 | Other hyperparameters |

Table 1 is herein referenced as FIG. 8 as well.

The subsequent description of hyperparameters generally relates to financial asset data such as stock market data, however hyperparameters may be adapted to other time series data as would be apparent to one of ordinary skill in the art. This list is meant to be exemplary and not to be considered limiting to the scope of variables which can be analyzed or hyperparameters which can be used in accordance with this disclosure. In one aspect, at least one hyperparameter may be established for initial analysis, then subsequently adjusted through machine learning and artificial intelligence as additional data is obtained and processed.

HP1 and HP2 comprise financial asset value property (ies) to be used curve fitting computation and analysis. HP1 and HP2 separately and independently comprise at least one of, but not limited to, opening price for each sampling period, closing price for each sampling period, high price for each sampling period, low price for each sampling period, average price for each sampling period, trading volume for each sampling period, volume weighted average price for each sampling period, etc. HP1 and HP2 may be the same variable or may be different variables, may be specified by a user, or may be determined automatically by the moving average analysis engine 102 which considers all options and determines which variable provides the best result.

HP3 and HP3a together define a portion or subset of the data set and moving average lines that will be compared in the fitting analysis. HP3 defines the number of most recent data points to use in fitting analysis (i.e. the furthest time period (or data point) from the last/most recent for which fitting analysis is done). By default, HP3a is zero indicating that fitting will be done for the most recent data points up to and including HP3, in which case the fitting range will be HP3. However, HP3a may be greater than zero allowing fitting analysis to be done for a customizable range of the data set that does not end with the most recent time period or last data point. As an alternative to specifying a number of data points, HP3 and HP3a may define a time frame over which the fitting analysis should be done. For example, HP3 and HP3a may comprise a date and/or time (both past or one past and one present) over which the fitting analysis should be done.

HP4 comprises the fitting analysis measurement to be used when comparing a moving average line derived from HP1 with the data points from HP2. HP4 comprises at least one of, but are not limited to, determining which moving average line has the most least-distant points from the HP2 data, a least squares fitting approach, a least absolute deviation approach, etc. This list is exemplary and any fitting approach can be used to quantify the degree of fit of a moving average line derived from HP1 to the data points of HP2.

Figure 2B:
FIG. 2B illustrates exemplary graphs depicting different scenarios associated with hyperparameters in accordance with one aspect of the present invention.

HP4a defines whether moving average lines which are intersected or pierced by the financial asset data are to be used in the fitting process. FIG. 2B shows an example of a moving average line which is occasionally intersected by (or pierced by) the financial asset data before the financial asset data bounces back or returns to continue its previous trend of remaining above or below the moving average line. As can be seen in this example, piercing generally occurs for a relatively short time period such as one or a few consecutive data points before the data points return to remaining above or below the moving average line.

HP5 comprises the number of moving average lines derived from HP1 and fit to the data points of HP2, to be output as results. In one aspect, this value may be set by a user such as in circumstances where the user wants to see the five best fitting moving average lines. In one aspect, HP5 is determined automatically by the moving average analysis engine 102 depending on at least one additional consideration such as computation time/energy, if a plurality of lines have very similar fitting results, etc.

HP6 comprises the type of moving average line to calculate from HP1 and fit to the data points of HP2. HP6 comprises at least one of, but not limited to, simple (or arithmetic), exponential, smoothed, weighted, etc moving average calculation approaches. Other moving average lines are included and can be used without diverting from the scope of the invention.

HP7 and HP8 define the range of sampling periods (data points) to use in generating moving average lines. HP7 establishes a minimum number of sampling periods to use, while HP8 establishes a maximum number of sampling periods to use in generating moving average lines. For each value, N, between HP7 and HP8, inclusive, a moving average line can be generated using the associated N data points.

HP9 comprises at least one additional hyperparameter to be used in processing of the financial asset data. In one aspect, HP9 comprises at least one user defined hyperparameter to be incorporated into the data processing. In one aspect, HP9 comprises at least one hyperparameter determined by the moving average analysis engine 102, such as additional hyperparameter(s) associated with machine learning and artificial intelligence which moving average analysis engine 102 determines and modifies over time as part of training and learning associated with moving average line processing.

User preferences interface 205 is operable to obtain at least one user preference from user device(s) 101 for use in data processing and output. User preferences comprise at least one of financial asset data to be used (e.g. stock market data associated with specific stock symbols), sampling rate, sampling interval/period, a minimum number of periods of data to be used in analysis, a maximum number of periods of data to be used in analysis, variable(s) to be used in determining a moving average line (i.e. HP1) and to fit the moving average line against (i.e. HP2), type of moving average line to fit to the data, whether the moving average line is allowed to intersect the financial asset data line, display preferences (such as price candles, colors, number of moving average lines to display, etc.). This list is merely exemplary and other values or calculations can be used. Furthermore, user preferences comprise an automatic detection option in which case the moving average analysis engine 102 would automatically determine which variable to analyze based on the financial asset data set. In one aspect, user preferences interface 205 receives changes or updated preferences and subsequently, in real-time, informs the other components of the moving average analysis engine 102 to update the moving average calculations and associated output. For example, if a user changes the sampling interval and/or changes the stock symbol to be analyzed via user preferences interface 205, moving average analysis engine 102 accordingly obtains the necessary financial asset data, updates hyperparameters, performs updated moving average calculations and processing, and outputs moving average processing results in accordance with the updated user preferences.

Moving average calculation module 206 determines a moving average line in accordance with the above hyperparameters. In particular, moving average calculation module 206 determines, for each variable defined by HP1, at least one moving average line of each type defined by HP6. In one aspect, a user may specify at least one variable of HP1 for which moving average lines should be computed. In one aspect, moving average calculation module 206 is operable to determine a moving average line for each of the possible variables of HP1 as listed above, such as when moving average calculation module is operating under an automatic detection mode which computes all possible moving average lines and automatically determines the best line for the given circumstances. Moving average module 206 determines a moving average line of each type using N periods (data points) as defined by HP7 and HP8, such that HP7≤N≤HP8, thereby resulting in a list of L moving average lines. For example, moving average module 206 may begin with N=HP8, determine a moving average line associated with HP8, decrease N by 1, determine a moving average line associated with HP8-1, and continue decreasing N and repeat determining a moving average line until ending with a moving average line associated with N=HP7. This order is merely exemplary and presented to illustrate the number of lines that can be generated and the system need not determine the moving average lines in any particular order nor perform sequentially incremented/decremented determinations.

Moving average ranking module 207 obtains the list of L moving average lines, performs fitting measurements between the moving average lines and data defined by HP2, for the range of data defined by HP3 and HP3a, in accordance with at least one approach as defined by HP4 while accounting for any limitations imposed by HP4a (i.e. whether the moving average line can intersect/cross the plotted data points), ranks the fitting results, and determines the M best results, where M=HP5. By specifying a particular range as defined by HP3 and HP3a a user is provided more control over a time period of interest to them to aid in making trading decisions. Furthermore, using narrower fitting ranges decreases computation time which in turn provides faster results to a user allowing them to make trading decisions in real time.

In one aspect, moving average ranking module 207 obtains the list of L moving average lines after all L have been determined, then performs ranking determinations. In one aspect, moving average ranking module 207 obtains each moving average line of the L lines, as each one is determined, and performs dynamic ranking and optimization of the L moving average lines. In one aspect, the dynamic ranking comprises comparing the fit of a newly generated line with the previously determined top M results and decides based on this comparison if the top M results should be updated. For example, if a newly generated line is determined to have a weaker fit result than the top M results, the newly generated line is labeled as such or otherwise ignored. If a newly generated line is determined to have a better fit result than at least one of the top M results, the newly generated line is labeled as such, the weakest fitting result of the M results is removed from the list of best M results, the newly generated line added to the list of M best results and the list of M results is re-ranked according to best fit result.

In one aspect, moving average ranking module 207 determines the next line to generate (i.e. the next N number of periods to use in generating a moving average line), and communicates this to the moving average calculation module 206. In one aspect, the next N to use is randomly selected from all possible N values as defined above by HP7 and HP8. In one aspect, the next N to use is determined based on the N values associated with the M best lines that have previously been determined. For example, N may be moved in one direction from the existing best result (e.g. increasing from the N associated with the best result) until fitting results diminish beyond a threshold, then N may be moved in the opposite direction (e.g. decreasing from the N associated with the best result) until fitting results diminish beyond a threshold. Alternatively, increasing/decreasing from the N associated with the best result may be done simultaneously until the fitting results in either direction diminish beyond a threshold. As an alternative to thresholds, moving average ranking module 207 may analyze trends associated with the fitting measurements and may stop calculating new lines using new N values if the fitting results for different N values appear to be trending away from the best previous results. Performing this dynamic ranking and optimization (e.g. determination of the next N values to use in generating a moving average line) the system can more efficiently process incoming data and arrive at a suitable result more quickly without necessarily needing to determine every possible moving average line which can be computationally demanding.

Output interface 208 provides at least one of the financial asset data, the M best moving average lines, the best moving average line, and a list of the M best moving average lines and associated information (e.g. moving average line type, fitting period used, number of periods (N) associated with each moving average line, etc.) for display on user device(s) and/or to be stored in a datastore for later reference. The output may be in the form of a graphical representation such as plotting the moving average lines along with the financial asset data, optionally highlighting the range of data and the moving average lines over which fitting was performed.

Figure 3A:
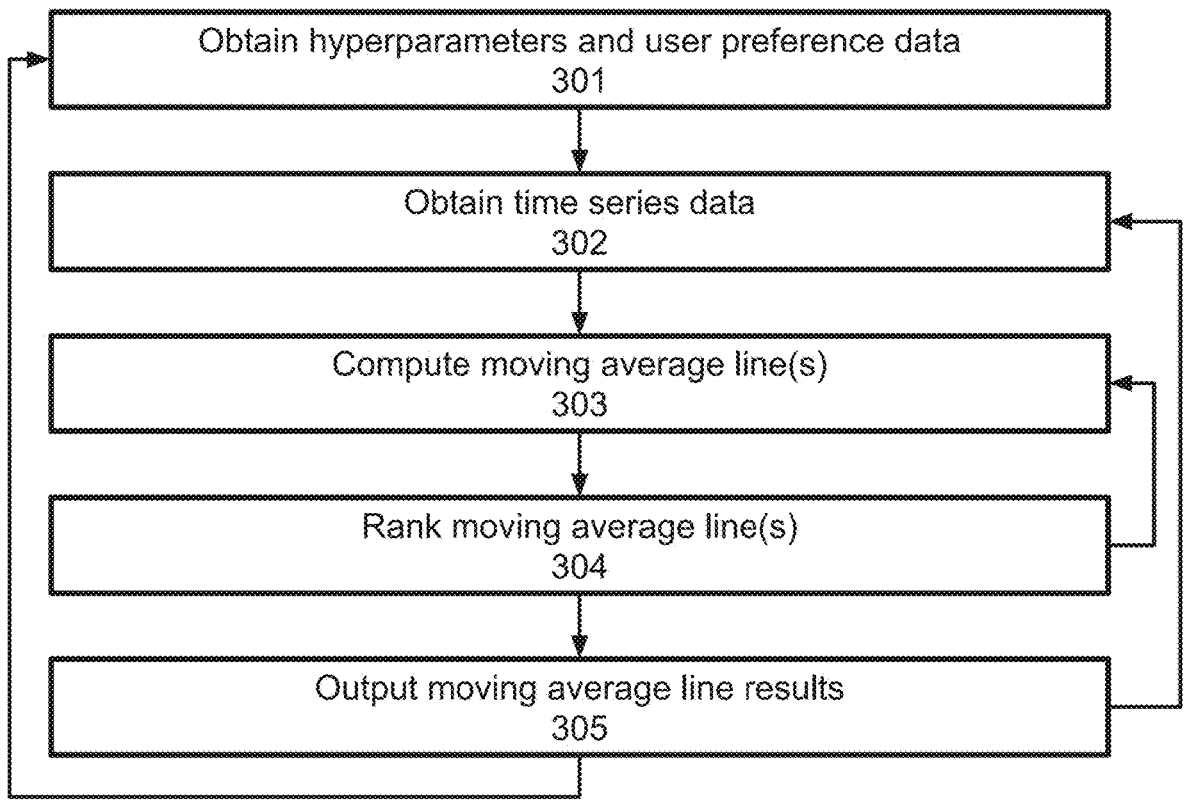
FIG. 3A illustrates an exemplary process for computing and ranking moving average lines according to one embodiment of the invention.

FIG. 3A illustrates an exemplary process for ranking and outputting the moving average line results associated with stock market data, in accordance with an embodiment of the invention. The process comprises obtaining hyperparameters and user preferences 301, obtaining financial asset data 302, determining moving average line(s) 303, ranking moving average line(s) 304, and outputting the moving average line results 305. The process described herein can be dynamic in nature, repeating continuously as new financial asset data becomes available and/or as new hyperparameters or user preferences are obtained and therefore the process may begin at a step other than that first listed. The process may comprise additional steps, fewer steps, and/or a different order of steps without departing from the scope of the invention as would be apparent to one of ordinary skill in the art.

The process may begin by obtaining hyperparameters and user preferences 301. User preferences comprise at least one of those as discussed above and generally will include identification of at least one stock symbol to analyze, a sampling time of interest (e.g. daily price, price every X minutes, X hours, etc.), and any associated hyperparameters as discussed above that a user wants to specify. Any hyperparameter unspecified by a user may be given a default value for processing.

At step 302, the process comprises obtaining financial asset data. In this embodiment, financial asset data comprises stock market trading data associated with the at least one identified stock symbol covering a period of trading history in accordance with the user preferences and hyperparameters, sampled at the specified sampling time of interest. At any point in time or in the process, a user may change the user preferences, such as stock symbol of interest or sampling time, triggering the process to obtain new or updated financial asset data.

At step 303, the process comprises determining at least one moving average line 303 in accordance with the hyperparameters. For example, as discussed above, a set of L moving average lines may be generated, where L comprises a moving average line for each period N as defined by hyperparameters HP7 and HP8. Alternatively, in the case of dynamic ranking and optimization, moving average line(s) may be determined one at a time or in smaller batches then proceeding to the ranking step 304 without necessarily generating a line for each N.

At step 304, each moving average line undergoes fitting analysis in accordance with the hyperparameters and is then ranked according to the fitting result. In this step, fitting is performed for only the portion of the financial asset data and moving average line associated with a specified fitting period as defined by HP3 and HP3a. In this way, a more focused analysis of different time periods can be performed and computational efficiency is improved. In one aspect, a full set of L moving average lines comprising a line for each N as defined by hyperparameters HP7 and HP8 is analyzed and ranked. In one aspect, as each moving average line is generated it is dynamically ranked with other previously generated moving average lines. In one aspect, the results of the dynamic ranking are used to determine the next moving average line to generate (i.e. the next N to use). In one aspect, dynamic ranking employs thresholds and/or trend analysis to determine the next moving average line to generate and whether it is necessary to continue generating more moving average lines or if the best (above a degree of certainty) moving average line(s) have already been found.

At step 305, the process comprises outputting the moving average line analysis results. In one aspect, this comprises a graphical representation such as plotting at least one of the highest ranking moving average lines along with the financial asset data, optionally highlighting the range of data and the moving average lines over which fitting was performed. In one aspect output comprises a list of the best moving average lines and associated information such as moving average line type, fitting period used, number of periods (N) associated with each moving average line, etc.

Figure 3B:
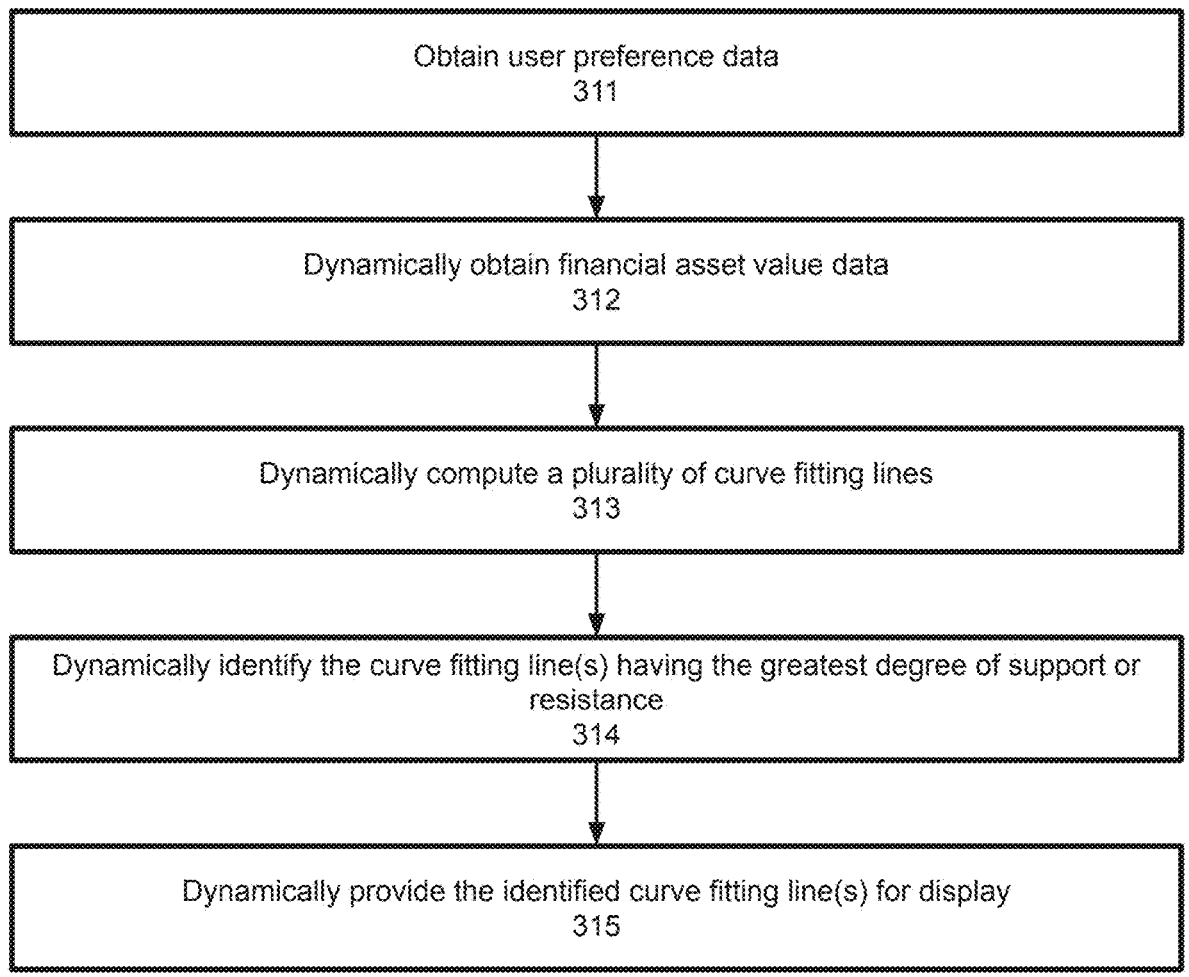
FIG. 3B illustrates an exemplary process for dynamically evaluating and computing associated curve fitting lines for use in aiding trading decisions according to one embodiment of the invention.

FIG. 3B illustrates an exemplary process for dynamically evaluating and computing associated curve fitting lines for use in aiding trading decisions according to one embodiment of the invention. The process comprises obtaining user preference data 311, dynamically obtaining financial asset value data 312, dynamically computing a plurality of curve fitting lines 313, dynamically identifying the curve fitting line(s) having the greatest degree of support or resistance 314, and dynamically providing the identified curve fitting line(s) for display 315. The process may comprise additional steps, fewer steps, and/or a different order of steps without departing from the scope of the invention as would be apparent to one of ordinary skill in the art.

At step 311, the process comprises obtaining user preference data. User preference data may comprise at least one of financial asset(s) (e.g. stocks, stock options, futures, cryptocurrencies, indexes, bond yields, currency pairs) information such as identification information (e.g. trading symbol(s)), an associated trading period of interest (e.g. a period of minutes, hours, days, weeks, months, or years) for the financial asset, and a sampling interval defining the sampling rate or number of sampling points the trading period of interest will be divided into and/or the rate at which new financial asset data while be sampled/obtained as it becomes available. In one aspect, user preference data may comprise at least one hyperparameter (such as those described above) for use in performing curve fitting line computations and analysis. In one aspect, the hyperparameter(s) may assume default values for use in performing curve fitting line computations and analysis. In one aspect, the hyperparameter(s) are usable in identifying the financial asset value property (e.g. opening value, closing value, etc.) to be used in curve fitting computations and analysis. In one aspect, the hyperparameter(s) are usable in defining curve fitting criteria to be used in curve fitting line computations and analysis. In one aspect, curve fitting criteria comprise a curve fitting calculation type to be used, such as moving average. Moving average calculations may comprise at least one of arithmetic, exponential, smoothed, and weighted moving average calculations. In one aspect, curve fitting criteria comprise at least one of a minimum number of sampling points (i.e. sampling periods within the trading period of interest) and a maximum number of sampling points to be used in curve fitting computations and analysis. In one aspect, curve fitting criteria may comprise a total number of curve fitting lines having the greatest degree of support or resistance to be identified among a plurality of computed curve fitting lines. In one aspect, curve fitting criteria comprise a curve fitting analysis measurement to be used such as determining which curve fitting line has the most least-distant points relative to the financial asset value data. As another example, the curve fitting analysis measurement may comprise a measure of the quantity of financial asset value data points (e.g. closing prices) above the curve if identifying a curve that supports the financial asset value data (or the quantity of data points below the curve if identifying a curve that resists the financial asset value data). In one aspect, this may comprise identifying and quantifying the number of attributed data points (e.g. closing prices) within each sampling interval associated with financial asset value data which crosses the curve during a sampling period (i.e. the price fluctuates over the sampling period/interval between a high value above the curve and a low value below the curve) and ends the sampling period at a value above the curve. In yet a further example, the curve fitting analysis measurement may comprise a measure quantifying the number of occurrences where a series of financial asset value data points which generally remain above the curve, dip down to touch the curve and then rebound above and away from the curve (e.g. by a threshold amount/percentage) thus providing an indication of a degree of support of the curve for the financial asset value data. Similarly, the opposite may be used for measuring the degree of resistance, namely quantifying the number of occurrences where a series of financial asset value data points which generally remain below the curve, climb up to touch the curve and then rebound below and away from the curve (e.g. by a threshold amount/percentage) thus providing an indication of a degree of resistance of the curve for the financial asset value data. These are merely exemplary and other curve fitting measurements may be used. In one aspect, user preference data may be obtained via at least one of a graphical user interface and associated graphical user interface element(s) and a command line interface.

At step 312, the process comprises dynamically obtaining financial asset value data. Financial asset value data may comprise trading price data over the financial asset trading period of interest for a plurality of sampling intervals based on the sampling interval specified in the obtained user preference data. Financial asset value data may comprise trading price data associated with at least one financial asset value property (e.g. opening price, closing price, etc.) for each sampling interval. For example, given a trading period of interest of one week and a sampling interval of one hour, financial asset value data may be obtained for each hour over the most recent week of trading associated with the financial asset. Obtaining financial asset data may comprise obtaining financial asset value data from at least one financial asset value data source, such as financial asset value data source(s) 104 described above. Dynamically obtaining may comprise repeatedly new or updated financial asset value data based on the sampling interval as new data becomes available. Returning to the above example of a sampling interval of one hour, dynamically obtaining may comprise obtaining new/updated financial asset data every hour as the data becomes available. In one aspect, dynamically obtaining may comprise switching from one data set to another, such as when new user preference data is obtained. For example, when new user preference data is obtained (e.g. when a user changes at least one user preference as described above), the process may update, in substantially real-time, the financial asset value data which is obtained. In one aspect, a change in user preferences may comprise at least one of resampling of financial asset value data based on a new sampling interval, switching from one financial asset to another when a new financial asset identifier is obtained, etc. These are merely exemplary changes which may occur and any change in user preference data discussed above may result in a dynamic change in the obtaining of financial asset value data.

At step 313, the process comprises dynamically computing a plurality of curve fitting lines. Computing a plurality of curve fitting lines may comprise as discussed above in association with FIGS. 1, 2A and 3A. In one aspect, computing a plurality of curve fitting lines comprises computing a line using each number of data points or sampling points of the obtained financial asset value data as determined based on the user preference data. For example, if the total number of sampling intervals for a given trading period of interest comprises fifty sampling intervals and a user preference specifies the minimum number of sampling intervals to be used as five, then a total of forty-six curves may be computed. That is, a curve may be computed using each of the five most recent sampling intervals, the six most recent sampling intervals, the seven most recent sampling intervals, and so on for each integer value up to the fifty most recent sampling intervals. This is merely exemplary and any number of curves may be computed based on the particular user preferences, hyperparameter(s) data, and/or an applied optimization of the computation designed to strategically arrive at the optimal result without necessarily needing to compute each and every curve fitting line. For example, an optimization algorithm may take into account how each computed curve fitting line fits to the data (e.g. by interlacing the curve fitting line computation with curve fit analysis) and determine whether it is necessary to continue computing additional curve fitting lines (e.g. if the fit analysis indicates the fit is continually getting worse, this may indicate that the best fit has already been achieved and further curve fitting line computation and fit analysis is unnecessary). Dynamically computing a plurality of curve fitting lines may comprise repeatedly computing a plurality of curve fitting lines as new financial asset value data is obtained, such as when new data is obtained in association with the sampling interval (e.g. after the sampling interval time has passed and a new data point has been acquired).

At step 314, the process comprises dynamically identifying the curve fitting line(s) having the greatest degree of support or resistance. In one aspect, identifying the curve fitting line(s) having the greatest degree of support or resistance comprises computing a degree of fit of each curve with respect to the financial asset value data. In one aspect, each computed curve is associated with having either a degree of support or a degree of resistance of a fluctuating value of the financial asset value data. A degree of support may comprise a measure indicating the extent to which a curve remains below the data points of the financial asset value data. In general, the more data points at which the curve remains below the data points of the financial asset value data, the greater the degree of support will be. However, this general condition alone may not be sufficient to determine the sought degree of support since the distance between the specified financial asset value property (e.g. high price, low price, etc.) for each sampling interval of the financial asset value data and a point on the curve at the corresponding time will also impact the degree of support calculation. A degree of resistance may comprise a measure indicating the extent to which a curve remains above the data points of the financial asset value data. In general, the more data points at which the curve remains above the data points of the financial asset value data, the greater the degree of resistance will be. However, this general condition alone may not be sufficient to determine the sought degree of resistance as the distance between the specified financial asset value property for each sampling interval of the financial asset value data and a point on the curve at the corresponding time will also impact the degree of resistance calculation. In one aspect, the degree of support or resistance may be associated with how well a curve fits the data based on curve fitting criteria. In one aspect, the curve having the highest degree of support or resistance is associated with the curve having the greatest number of least-distant points with respect to the financial asset value data (in particular with respect to the financial asset value property of interest for each sampling interval). In one aspect, the curve having the highest degree of support or resistance is associated with lowest cumulative distance between each financial asset value data point (in particular the financial asset value property of interest for each sampling interval) and the corresponding point on the curve. In one aspect, the curve(s) having the best fit to the financial asset value data will be associated with the highest degree of support or resistance. In one aspect, user preference data may indicate whether a curve is allowed to pierce or intersect the financial asset value data which in turn affects the identification of the curve fitting line(s) having the greatest degree of support or resistance or the curve which best fits the data. For example, a curve fitting line which generally passes through the center of the financial asset value data will generally have a better fit to the data, however it requires the curve fitting criteria to allow for piercing or intersection of the data. Furthermore, this type of curve would generally not provide an indication of support or resistance, but rather indicates the general value data fluctuation. Alternatively, when curve fitting criteria do not allow for piercing or intersection of the data (or only allow for limited piercing or intersection of the data), a curve can be identified which most closely fits the data while remaining above the data (i.e. resists the data) or which most closely fits the data while remaining below the data (i.e. supports the data).

Figure 3C:
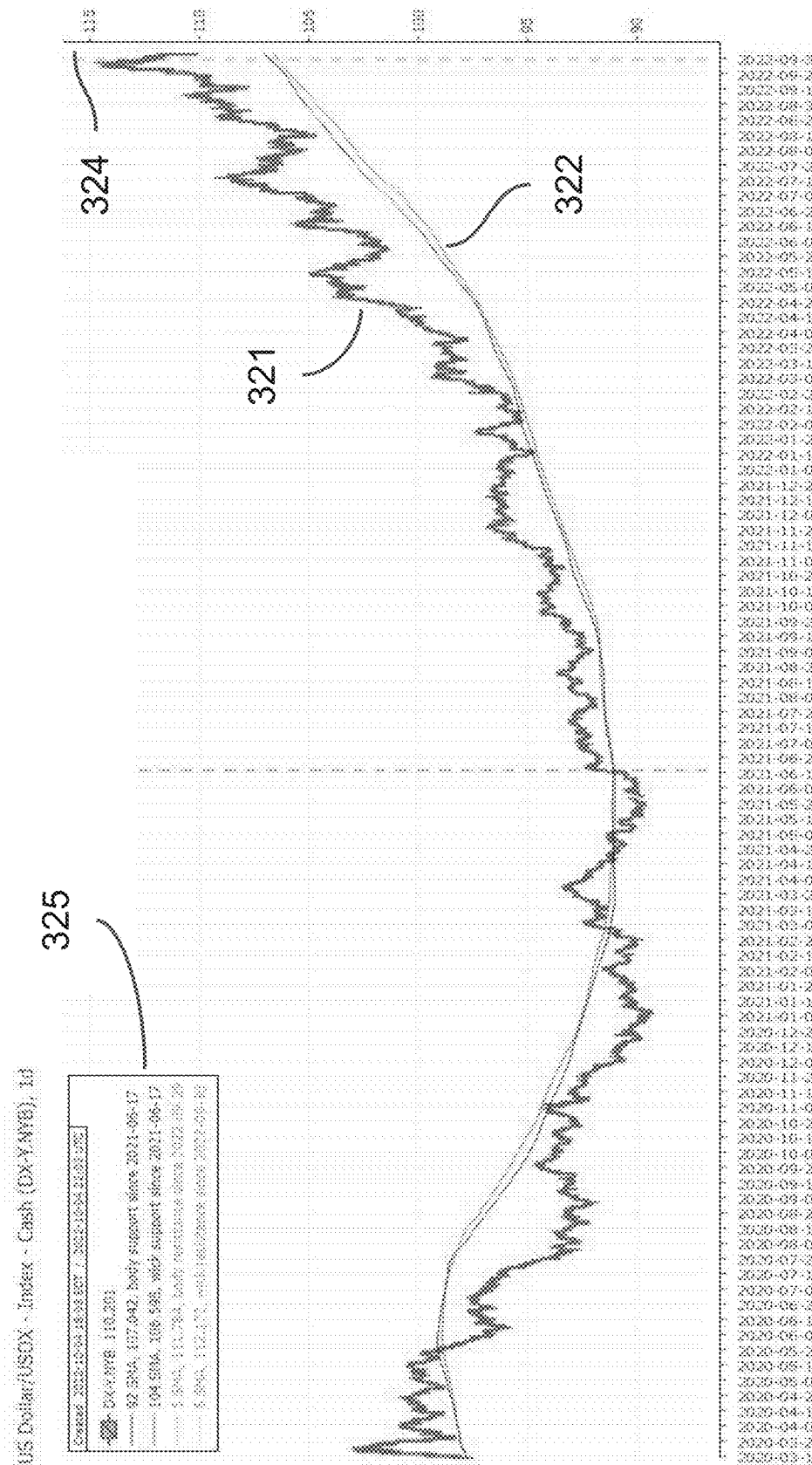
FIG. 3C illustrates an exemplary display or user interface according to one aspect of the invention.

At step 315, the process comprises dynamically providing at least one of the identified curve fitting line(s) and associated curve fitting line data for display. In one aspect, providing comprises providing the curve fitting line(s) and/or associated curve fitting line data to a user device for display alone or in combination with financial asset value data (wherein the financial asset value data for display may be obtained and displayed independently of curve fitting line(s) and/or associated curve fitting line data). In one aspect, providing comprises plotting the curve fitting line(s) in combination with financial asset value data and providing the combination for display on at least one user device. In one aspect, providing comprises providing the curve fitting line(s) and/or associated curve fitting line data in a file format for download by a user for subsequent use in trading decision analysis which may comprise displaying the resulting curve fitting line data and/or associated curve fitting line data. In one aspect, providing comprises providing the curve fitting line(s) and/or associated curve fitting line data as a service via a network (e.g. providing data via JSON format in response to an HTTP or HTTPS request). FIG. 3C illustrates an exemplary user interface or display of the provided information. The exemplary displayed information comprises financial asset value data 321 for a time frame, curve fitting lines 322 which represent the best fit or best support for the financial asset value data, a time axis 323 indicating the time frame associated with the displayed data, a value axis 324 indicating the value(s) of the associated displayed data, and associated curve fitting line data 325 indicating aspects associated with the cure fitting lines such as the number of sampling periods associated with the curve fitting lines, the period or duration of support associated with each curve fitting line, the type of curve fitting line computed/displayed (e.g. simple moving average), etc.

Generally, the techniques disclosed herein may be implemented via hardware or a combination of software and hardware. For example, they may be implemented in an operating system kernel, in a separate user process, in a library package bound into network applications, on a specially constructed machine, on an application-specific integrated circuit (ASIC), on a network interface card, and/or via cloud based services.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments). Any of the above mentioned systems, units, modules, engines, controllers, components or the like may be and/or comprise hardware and/or software as described herein. For example, the moving average analysis engine 102 and subcomponents thereof may be and/or comprise computing hardware and/or software as described herein in association with FIGS. 4-7. Furthermore, any of the above mentioned systems, units, modules, engines, controllers, components, interfaces or the like may use and/or comprise an application programming interface (API) for communicating with other systems units, modules, engines, controllers, components, interfaces or the like for obtaining and/or providing data or information.

Figure 4:
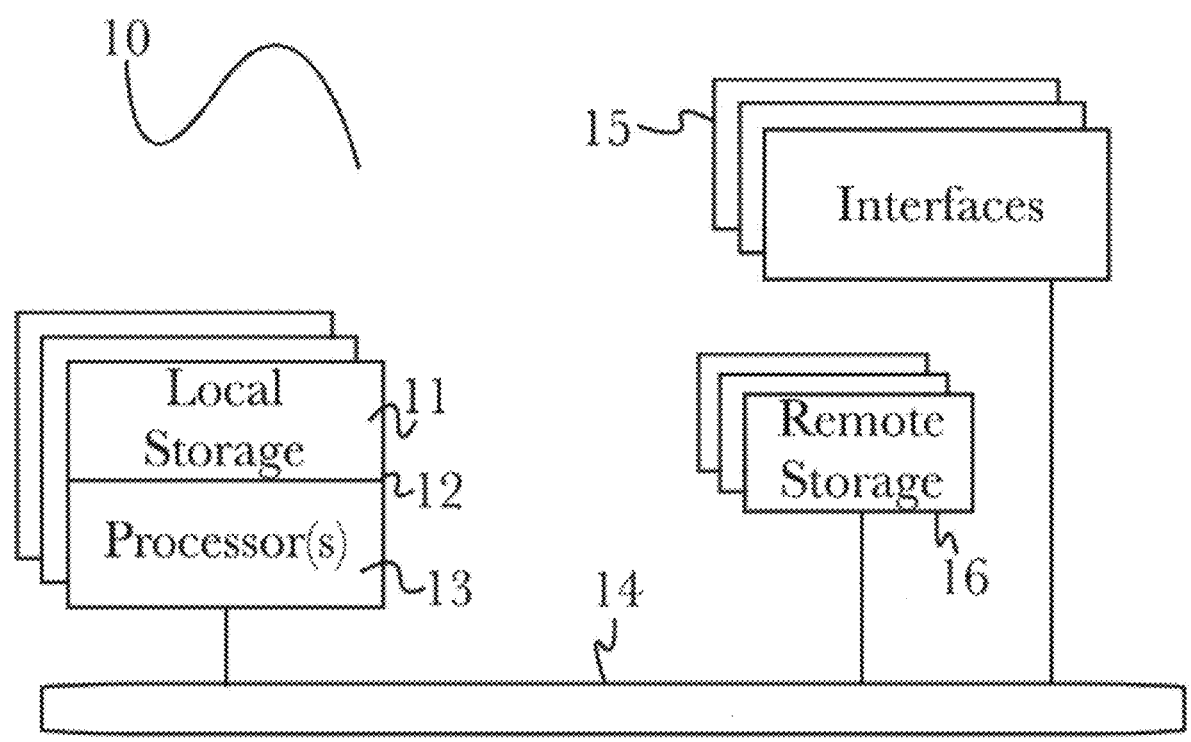
FIG. 4 illustrates one embodiment of the computing architecture that supports an embodiment of the inventive disclosure.

Referring now to FIG. 4, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random-access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 4 illustrates one specific architecture for a computing device 10 for implementing one or more of the embodiments described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, single processor 13 handles communications as well as routing computations, while in other embodiments a separate dedicated communications processor may be provided. In various embodiments, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include non-transitory machine-readable storage media, which, for example, may be configured or designed to store program instructions, state information, and the like for performing various operations described herein. Examples of such non-transitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 5:
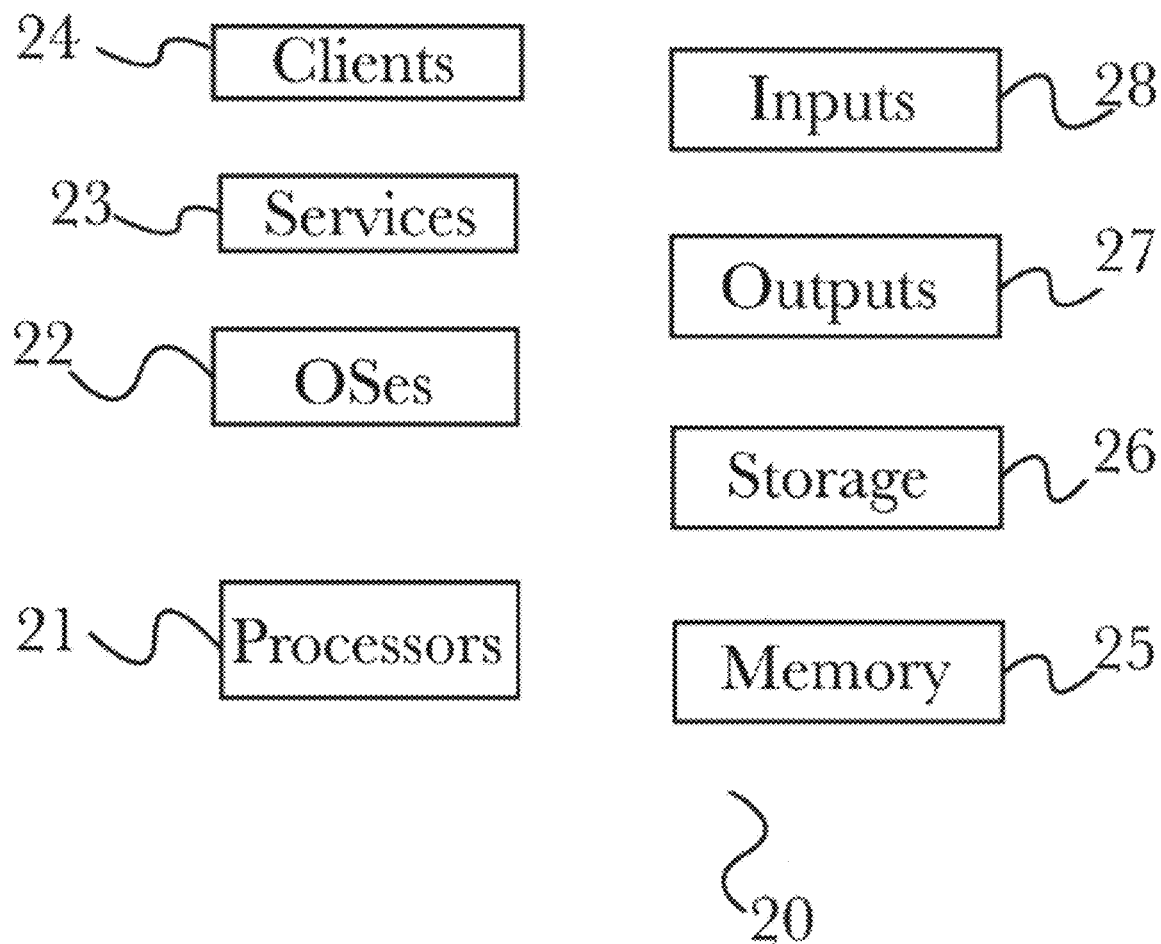
FIG. 5 illustrates components of a system architecture that supports an embodiment of the inventive disclosure.

In some embodiments, systems may be implemented on a standalone computing system. Referring now to FIG. 5, there is shown a block diagram depicting a typical exemplary architecture of one or more embodiments or components thereof on a standalone computing system. Computing device 20 includes processors 21 that may run software that carry out one or more functions or applications of embodiments, such as for example a client application. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 4). Examples of storage devices 26 include flash memory, magnetic hard drive, CD-ROM, and/or the like.

Figure 6:
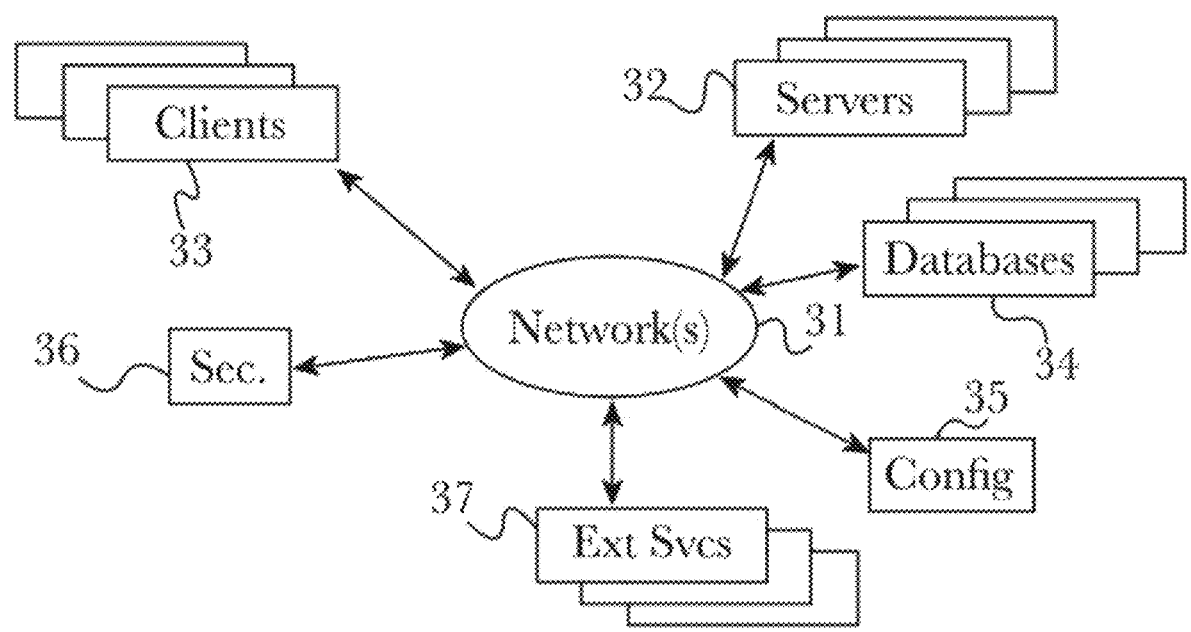
FIG. 6 illustrates components of a computing device that supports an embodiment of the inventive disclosure.

In some embodiments, systems may be implemented on a distributed computing network, such as one having any number of clients and/or servers. Referring now to FIG. 6, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 5. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in one aspect where client applications are implemented on a smartphone or other electronic device, client applications may obtain information stored in a server system 32 in the cloud or on an external service 37 deployed on one or more of a particular enterprise's or user's premises.

In some embodiments, clients 33 or servers 32 (or both) may make use of one or more specialized services or appliances that may be deployed locally or remotely across one or more networks 31. For example, one or more databases 34 may be used or referred to by one or more embodiments. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some embodiments may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 36 or configuration system 35 or approach is specifically required by the description of any specific aspect.

Figure 7:
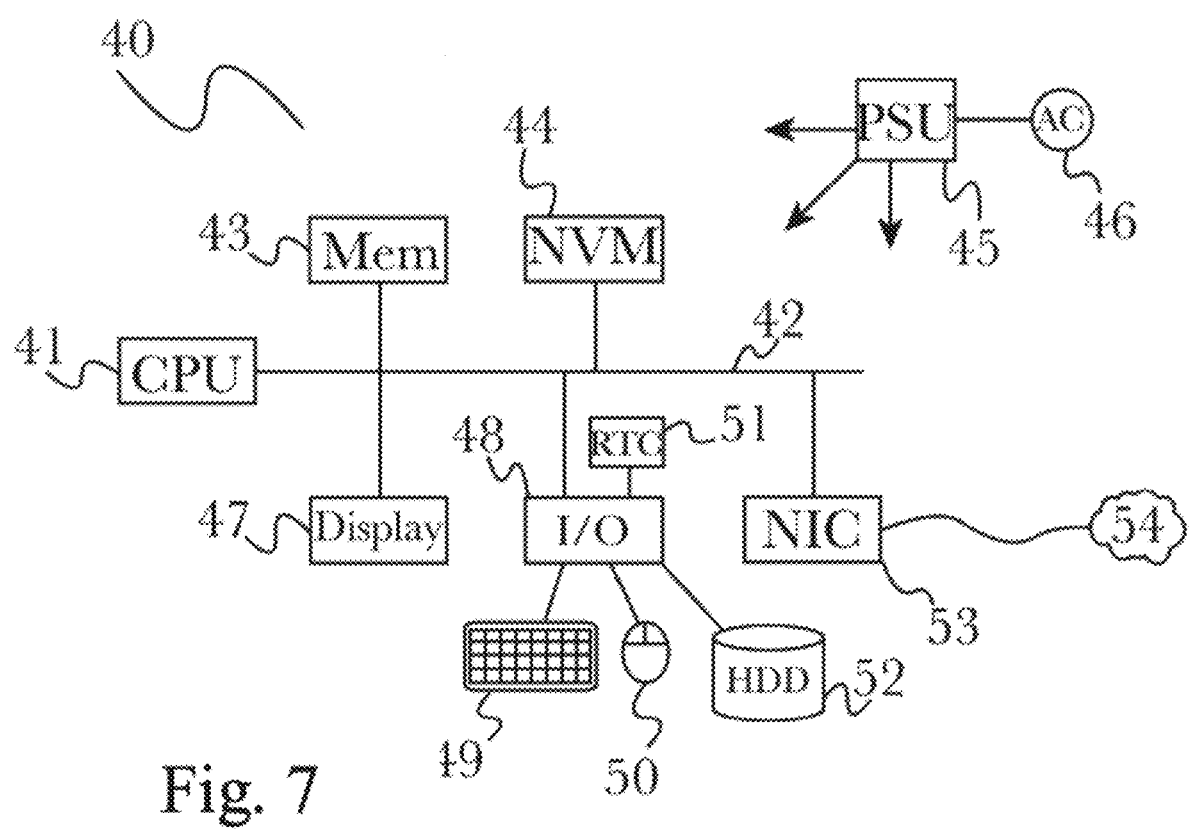
FIG. 7 illustrates components of a computing device that supports an embodiment of the inventive disclosure.

FIG. 7 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of various embodiments may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various embodiments described above. Accordingly, the present invention is defined by the claims and their equivalents.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and Bis false (or not present), A is false (or not present) and Bis true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and/or a process associated with the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims. For example, although described herein with respect to financial asset data, the invention is applicable to other time series data sets including both static data sets and dynamic data sets which change or are updated over time.

What is claimed is:

1. A computer implemented method for evaluating financial asset value fluctuation information and computing associated curve fitting lines for use in aiding trading decisions, the computer implemented method comprising:
    obtaining user preference data from a user via a user interface, wherein the user preference data comprises at least financial asset identification information, an associated financial asset trading period of interest, at least one hyperparameter and a sampling interval;
    amending the user preference data by generating a set of default hyperparameters for hyperparameters not provided by a user;
    obtaining financial asset value data from a financial asset value data source, the financial asset value data comprising time series data for at least one financial asset associated with the financial asset identification information and associated financial asset trading period of interest, the time series data comprising financial asset price data for each of a plurality of sampling intervals throughout the financial asset trading period of interest in accordance with the sampling interval obtained from the user preference data;
    computing a plurality of curve fitting lines and associated curve fitting data, each curve fitting line derived from a moving average calculation determined based on the obtained financial asset value data and obtained user preference data, each curve fitting line computed using a different number of sampling periods as compared to each other curve fitting line, each curve fitting line associated with a degree of support or resistance of a fluctuating value of the financial asset value data;
    identifying the curve fitting line having the greatest degree of support or resistance among the plurality of computed curve fitting lines, wherein a curve having support comprises a curve wherein a majority of points along the curve remain below the financial asset value, and wherein a curve having resistance comprises a curve wherein a majority of points along the curve remain above the financial asset value;
    wherein identifying comprises applying a fitting algorithm to identify the curve fitting line having the greatest degree of support or resistance, wherein in the fitting algorithm comprises a set of rules based on at least one hyperparameter, wherein the set of rules define a relationship between a curve fitting line and the financial asset value data in order for the curve fitting line to be considered as a line having support or resistance and wherein the rules define curve fitting criteria for determining a degree of support or resistance, wherein at least one hyperparameter defines whether the curve fitting line is allowed to intersect or cross the data;
    providing, for display via a user interface, at least one of the identified curve fitting line and associated curve fitting data.

2. The computer implemented method according to claim 1, wherein identifying comprises identifying a subset of the computed plurality of curve fitting lines, the subset of the plurality of curve fitting lines comprising a plurality of curve fitting lines having the greatest degrees of support or resistance among the computed plurality of curve fitting lines.

3. The computer implemented method according to claim 1, wherein the curve having the greatest degree of support or resistance corresponds to the curve which best fits the financial asset value data, the best fit determined based on curve fitting criteria.

4. The computer implemented method according to claim 3, wherein the curve fitting criteria comprise a moving average calculation type comprised of at least one of arithmetic, exponential, smoothed, and weighted.

5. The computer implemented method according to claim 3, wherein the curve fitting criteria comprise a specified number of curve fitting lines to identify.

6. The computer implemented method according to claim 1, wherein the user preference data comprises at least one of a financial asset value property to be used in the computing, a maximum number of sampling intervals over which the computing is performed, and a minimum number of sampling intervals to use in the computing.

7. The computer implemented method according to claim 6, wherein financial asset value property to be considered for the sampling interval comprises at least one of an opening value at the start of the sampling interval, a closing value at the end of the sampling interval, a maximum value achieved during the sampling interval, and a minimum value achieved during the sampling interval.

8. The computer implemented method according to claim 1, wherein the associated curve fitting data comprises an indication of the time period over which each corresponding curve fitting line is associated.

9. The computer implemented method according to claim 1, wherein the financial asset trading period of interest comprises at least one of a default financial asset trading period and a user specified trading period of interest, the default financial asset trading period and user specified trading period of interest comprised of a time period measured in minutes, hours, days, weeks, months, or years.

10. The computer implemented method according to claim 1, further comprising converting the obtained financial asset value data to a standardized format.

11. The computer implemented method according to claim 10, wherein the financial asset value data source comprises a plurality of data sources providing financial asset value data in different formats, wherein the converting comprises converting the obtained financial asset value data from different sources to a standardized format.

12. The computer implemented method according to claim 1, wherein identifying comprises ranking the plurality of computed curve fitting lines based on a fitting algorithm and identifying the curve fitting line having the greatest degree of support or resistance based on the ranking.

13. The computer implemented method according to claim 12, wherein ranking comprises ranking to update the rankings in real-time as new or updated curve fitting lines and associated curve fitting data are computed.

14. The computer implemented method according to claim 12, wherein identifying comprises identifying a plurality of curve fitting lines having the greatest degrees of support or resistance based on the ranking.

15. The computer implemented method according to claim 1, wherein the providing, for display via a user interface, provides an indication of at least one of: whether the financial asset value data respects the curve fitting line over a defined time period, a time at which the financial asset value data no longer respects the curve fitting line, and an updated curve fitting line which is respected by the financial asset value data when a previously identified curve fitting line is no longer respected by the financial asset value data.

16. The computer implemented method according to claim 1, wherein obtaining comprises obtaining via at least one of a graphical user interface element and a command entered via a command line interface.

17. The computer implemented method according to claim 1, wherein the obtaining, computing, identifying, and providing are performed in substantially real-time as updated financial asset value data becomes available.

18. The computer implemented method according to claim 1, wherein identifying the curve fitting line having the greatest degree of support or resistance among the plurality of computed curve fitting lines comprises:
ranking the curve fitting lines according to ranking criteria associated with at least one hyperparameter; and
selecting the highest ranked curve fitting line.

19. A computing system for evaluating financial asset value fluctuation information and computing associated curve fitting lines for use in aiding trading decisions, the computing system comprising:
at least one computing processor; and
memory comprising instructions that, when executed by the at least one computing processor, enable the computing system to:
obtaining user preference data from a user via a user interface, wherein the user preference data comprises at least financial asset identification information, an associated financial asset trading period of interest, at least one hyperparameter and a sampling interval;
amending the user preference data by generating a set of default hyperparameters for hyperparameters not provided by a user;
obtaining financial asset value data from a financial asset value data source, the financial asset value data comprising time series data for at least one financial asset associated with the financial asset identification information and associated financial asset trading period of interest, the time series data comprising financial asset price data for each of a plurality of sampling intervals throughout the financial asset trading period of interest in accordance with the sampling interval obtained from the user preference data;
computing a plurality of curve fitting lines and associated curve fitting data, each curve fitting line derived from a moving average calculation determined based on the obtained financial asset value data and obtained user preference data, each curve fitting line computed using a different number of sampling periods as compared to each other curve fitting line, each curve fitting line associated with a degree of support or resistance of a fluctuating value of the financial asset value data;
identifying the curve fitting line having the greatest degree of support or resistance among the plurality of computed curve fitting lines, wherein a curve having support comprises a curve wherein a majority of points along the curve remain below the financial asset value, and wherein a curve having resistance comprises a curve wherein a majority of points along the curve remain above the financial asset value;
wherein identifying comprises applying a fitting algorithm to identify the curve fitting line having the greatest degree of support or resistance, wherein in the fitting algorithm comprises a set of rules based on at least one hyperparameter, wherein the set of rules define a relationship between a curve fitting line and the financial asset value data in order for the curve fitting line to be considered as a line having support or resistance and wherein the rules define curve fitting criteria for determining a degree of support or resistance, wherein at least one hyperparameter defines whether the curve fitting line is allowed to intersect or cross the data;
providing, for display via a user interface, at least one of the identified curve fitting line and associated curve fitting data.

20. A non-transitory computer readable medium comprising instructions that when executed by a processor enable the processor to:
obtaining user preference data from a user via a user interface, wherein the user preference data comprises at least financial asset identification information, an associated financial asset trading period of interest, at least one hyperparameter and a sampling interval;
amending the user preference data by generating a set of default hyperparameters for hyperparameters not provided by a user;
obtaining financial asset value data from a financial asset value data source, the financial asset value data comprising time series data for at least one financial asset associated with the financial asset identification information and associated financial asset trading period of interest, the time series data comprising financial asset price data for each of a plurality of sampling intervals throughout the financial asset trading period of interest in accordance with the sampling interval obtained from the user preference data;
computing a plurality of curve fitting lines and associated curve fitting data, each curve fitting line derived from a moving average calculation determined based on the obtained financial asset value data and obtained user preference data, each curve fitting line computed using a different number of sampling periods as compared to each other curve fitting line, each curve fitting line associated with a degree of support or resistance of a fluctuating value of the financial asset value data;
identifying the curve fitting line having the greatest degree of support or resistance among the plurality of computed curve fitting lines, wherein a curve having support comprises a curve wherein a majority of points along the curve remain below the financial asset value, and wherein a curve having resistance comprises a curve wherein a majority of points along the curve remain above the financial asset value;

wherein identifying comprises applying a fitting algorithm to identify the curve fitting line having the greatest degree of support or resistance, wherein in the fitting algorithm comprises a set of rules based on at least one hyperparameter, wherein the set of rules define a relationship between a curve fitting line and the financial asset value data in order for the curve fitting line to be considered as a line having support or resistance and wherein the rules define curve fitting criteria for determining a degree of support or resistance, wherein at least one hyperparameter defines whether the curve fitting line is allowed to intersect or cross the data;

providing, for display via a user interface, at least one of the identified curve fitting line and associated curve fitting data.

* * * * *